US009787846B2

United States Patent
Srinivasan et al.

(10) Patent No.: US 9,787,846 B2
(45) Date of Patent: Oct. 10, 2017

(54) SPATIAL AUDIO SIGNAL PROCESSING FOR OBJECTS WITH ASSOCIATED AUDIO CONTENT

(71) Applicant: Microsoft Technology Licensing, LLC, Redmond, WA (US)

(72) Inventors: Sriram Srinivasan, Sammamish, WA (US); Ryan S. Menezes, Woodinville, WA (US); Shawn Crispin Wright, Sammamish, WA (US); Hongwu Huai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/602,246

(22) Filed: Jan. 21, 2015

(65) Prior Publication Data
US 2016/0212272 A1  Jul. 21, 2016

(51) Int. Cl.
| H04M 3/56 | (2006.01) |
| G06F 3/16 | (2006.01) |
| H04N 7/14 | (2006.01) |
| G06T 19/00 | (2011.01) |

(Continued)

(52) U.S. Cl.
CPC ............ H04M 3/567 (2013.01); G06F 3/165 (2013.01); G06T 19/006 (2013.01);
(Continued)

(58) Field of Classification Search
CPC ............ H04S 1/00; H04S 1/002; H04S 1/005; H04S 7/302; H04S 7/303; H04S 7/304; H04S 2400/11; H04S 2420/01; H04M 3/567; H04M 3/568; H04N 7/147; H04N 21/41407; H04N 21/42202; H04N 21/439; G06F 3/165; G06T 19/006
(Continued)

(56) References Cited

U.S. PATENT DOCUMENTS 8,767,968 B2 *  7/2014  Flaks ...................... A63F 13/10
                                                    345/633
9,036,842 B2 *  5/2015  Kim ........................ H04R 3/12
                                                    348/738

(Continued)

FOREIGN PATENT DOCUMENTS

| EP | 2824663 A2 | 1/2015 |
| WO | 2012104297 A1 | 8/2012 |

OTHER PUBLICATIONS

"International Search Report and Written Opinion Issued in PCT Application No. PCT/US2016/014206", Mailed Date: Apr. 14, 2016, 12 Pages.
"Second Written Opinion Issued in PCT Patent Application No. PCT/US2016/014206", Mailed Date: Dec. 13, 2016, 7 Pages.
"International Preliminary Report on Patentability", Application No. PCT/US2016/014206, Mar. 31, 2017, 8 pages.

*Primary Examiner* — Vivian Chin
*Assistant Examiner* — Jason R Kurr

(57) ABSTRACT

A user device for generating a scene, the user device comprising: an object determiner configured to determine an object for the scene, the object being associated with at least one audio signal; a relative position/orientation determiner configured to determine a relative position/orientation between the user device's user and the object; an audio position processor configured to spatially audio signal process the at least one audio signal to generate at least two channel audio signal based on the relative position/orientation.

20 Claims, 9 Drawing Sheets

(51) Int. Cl.
  *H04N 21/414* (2011.01)
  *H04N 21/422* (2011.01)
  *H04N 21/439* (2011.01)
  *H04S 7/00* (2006.01)
  *H04S 1/00* (2006.01)

(52) U.S. Cl.
  CPC ............ *H04M 3/568* (2013.01); *H04N 7/147* (2013.01); *H04N 21/41407* (2013.01); *H04N 21/42202* (2013.01); *H04N 21/439* (2013.01); *H04S 7/303* (2013.01); *H04S 1/00* (2013.01); *H04S 7/304* (2013.01); *H04S 2400/11* (2013.01); *H04S 2420/01* (2013.01)

(58) Field of Classification Search
  USPC ............................................. 381/2, 306, 310
  See application file for complete search history.

(56) References Cited

U.S. PATENT DOCUMENTS

| | | | |
|---|---|---|---|
| 9,244,925 B2* | 1/2016 | Avrahami | H04S 7/303 |
| 2009/0116652 A1 | 5/2009 | Kirkeby et al. | |
| 2011/0216060 A1* | 9/2011 | Weising | G09G 5/08 345/419 |
| 2012/0243689 A1* | 9/2012 | Jeong | G06T 7/2053 381/17 |
| 2013/0177168 A1 | 7/2013 | Inha et al. | |
| 2014/0118631 A1 | 5/2014 | Cho | |
| 2015/0223005 A1* | 8/2015 | Hardman | H04S 7/304 381/1 |
| 2016/0026253 A1* | 1/2016 | Bradski | G02B 27/225 345/8 |

\* cited by examiner

SPATIAL AUDIO SIGNAL PROCESSING FOR OBJECTS WITH ASSOCIATED AUDIO CONTENT

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

Embodiments of the present disclosure relate to spatial audio signal processing for objects with associated audio data content. For example objects within a shared scene with associated audio data content such as generated in collaborative mixed reality applications. In collaborative mixed reality applications, participants can visualize, place, and interact with objects in a shared scene. The shared scene is typically a representation of the surrounding space of one of the participants, for example the scene may include video images from the viewpoint of one of the participants. An object or virtual object can be 'placed' within the scene and may have a visual representation which can be 'seen' and interacted with by the participants. Furthermore the object can have associated content. For example the object may have associated content such as audio, image, video or text content. A participant may, for example, place a video player object in a shared scene, and interact with it to start playing a video for all participants to watch. Another participant may then interact with the video player object to control the playback or to change its position in the scene. Similarly the object may be a contact image or similar which may be displayed to the participants of the scene. The object may furthermore be associated with audio data. In such a way an 'audio' telephone call may be located within the scene. Similarly a video conference call participant may be represented within the scene by an object with associated video and audio data from the participant.

The inventors have recognised that the user may not always be visually aware of the position of these objects within the scene and thus may 'lose' where the object is relative to the user's location/orientation.

According to first aspect of the present disclosure there is provided a user device for generating a scene, the user device comprising: an object determiner configured to determine an object for the scene, the object being associated with at least one audio signal; a relative position/orientation determiner configured to determine a relative position/orientation between the user device's user and the object; an audio position processor configured to spatially audio signal process the at least one audio signal to generate at least two channel audio signal based on the relative position/orientation.

According to second aspect of the present disclosure there is provided a method implemented at a user device for generating a scene, the method comprising: determining an object for the scene, the object being associated with at least one audio signal; determining a relative position/orientation between the user device's user and the object; and spatially audio signal processing the at least one audio signal to generate at least two channel audio signal based on the relative position/orientation.

According to third aspect of the present disclosure there is provided a computer program product, the computer program product being embodied on a non-transient computer-readable medium and configured so as when executed on a processor of a user device for generating a scene, to: determine an object for the scene, the object being associated with at least one audio signal; determine a relative position/orientation between the user device's user and the object; and spatially audio signal process the at least one audio signal to generate at least two channel audio signal based on the relative position/orientation.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
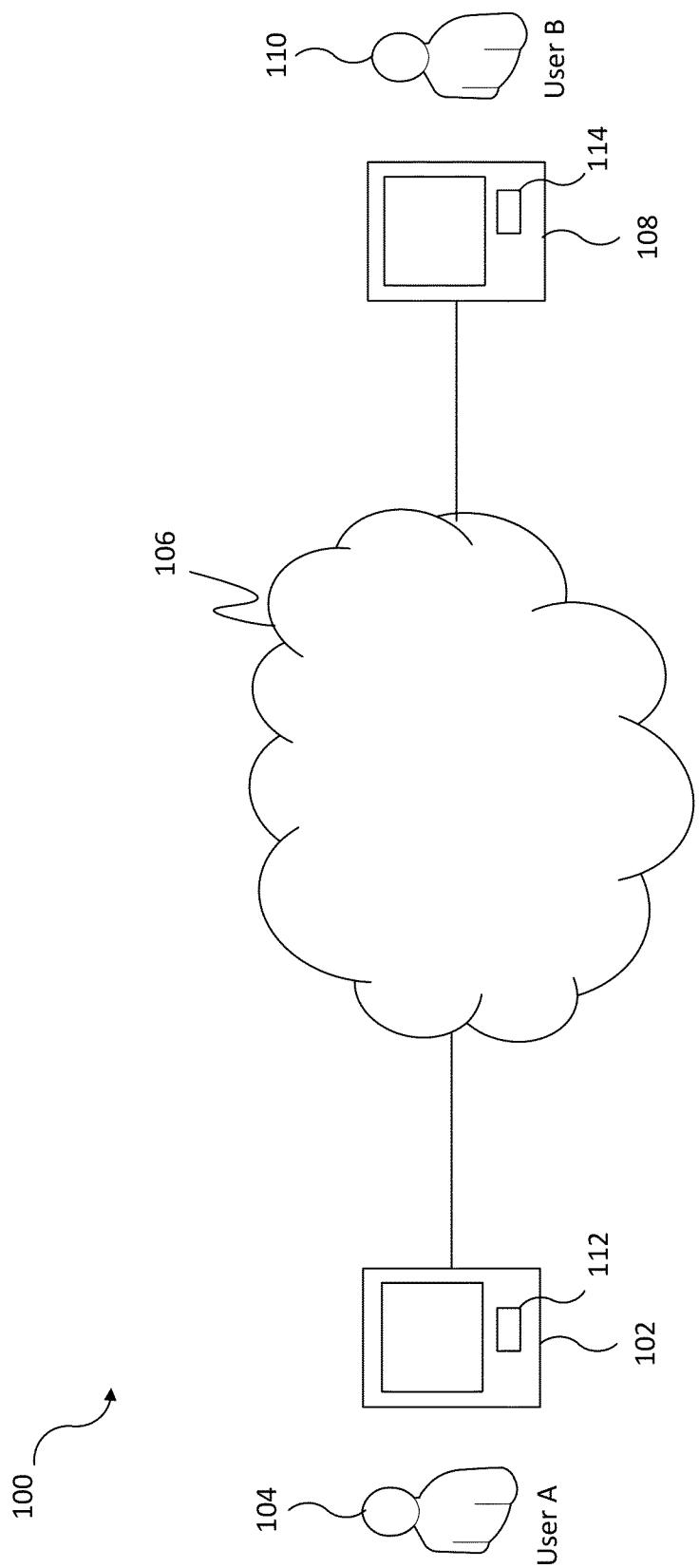
FIG. 1 shows a schematic view of a communication system.

FIG. 1 shows a communication system 100 comprising a first user 104 (User A) who is associated with a user terminal or device 102 and a second user 110 (User B) who is associated with a second user terminal or device 108. The user devices 102 and 108 can communicate over a communication network 106 in the communication system 100, thereby allowing the users 104 and 110 to communicate with each other over the communication network 106. The communication network 106 may be any suitable network which has the ability to provide a communication channel between the user device 102 and the second user device 108. For example, the communication network 106 may be the Internet or another type of network such as a high data rate cellular or mobile network, such as a 3$^{rd}$ generation ("3G") mobile network.

Note that in alternative embodiments, user devices can connect to the communication network 106 via an additional intermediate network not shown in FIG. 1. For example, if the user device 102 is a mobile device, then it can connect to the communication network 106 via a cellular or mobile network (not shown in FIG. 1), for example a GSM, UMTS, 4G or the like network.

The user devices 102 and 104 may be any suitable device and may for example, be a mobile phone, a personal digital assistant ("PDA"), a personal computer ("PC") (including, for example, Windows™, Mac OS™ and Linux™ PCs), a tablet computer, a gaming device, a wearable device or other embedded device able to connect to the communication network 106. The wearable device may comprise a wearable headset.

It should be appreciated that one or more of the user devices may be provided by a single device. One or more of the user devices may be provided by two or more devices which cooperate to provide the user device or terminal.

The user device 102 is arranged to receive information from and output information to User A 104.

The user device 102 executes a communication client application 112, provided by a software provider associated with the communication system 100. The communication client application 112 is a software program executed on a local processor in the user device 102. The communication client application 112 performs the processing required at the user device 102 in order for the user device 102 to transmit and receive data over the communication system 100. The communication client application 112 executed at the user device 102 may be authenticated to communicate over the communication system through the presentation of digital certificates (e.g. to prove that user 104 is a genuine subscriber of the communication system—described in more detail in WO 2005/009019).

The second user device 108 may be the same or different to the user device 102. The second user device 108 executes, on a local processor, a communication client application 114 which corresponds to the communication client application 112 executed at the user terminal 102. The communication client application 114 at the second user device 108 performs the processing required to allow User B 110 to communicate over the network 106 in the same way that the communication client application 112 at the user device 102 performs the processing required to allow the User A 104 to communicate over the network 106. The user devices 102 and 108 are end points in the communication system. FIG. 1 shows only two users (104 and 110) and two user devices (102 and 108) for clarity, but many more users and user devices may be included in the communication system 100, and may communicate over the communication system 100 using respective communication clients executed on the respective user devices, as is known in the art.

Figure 2:
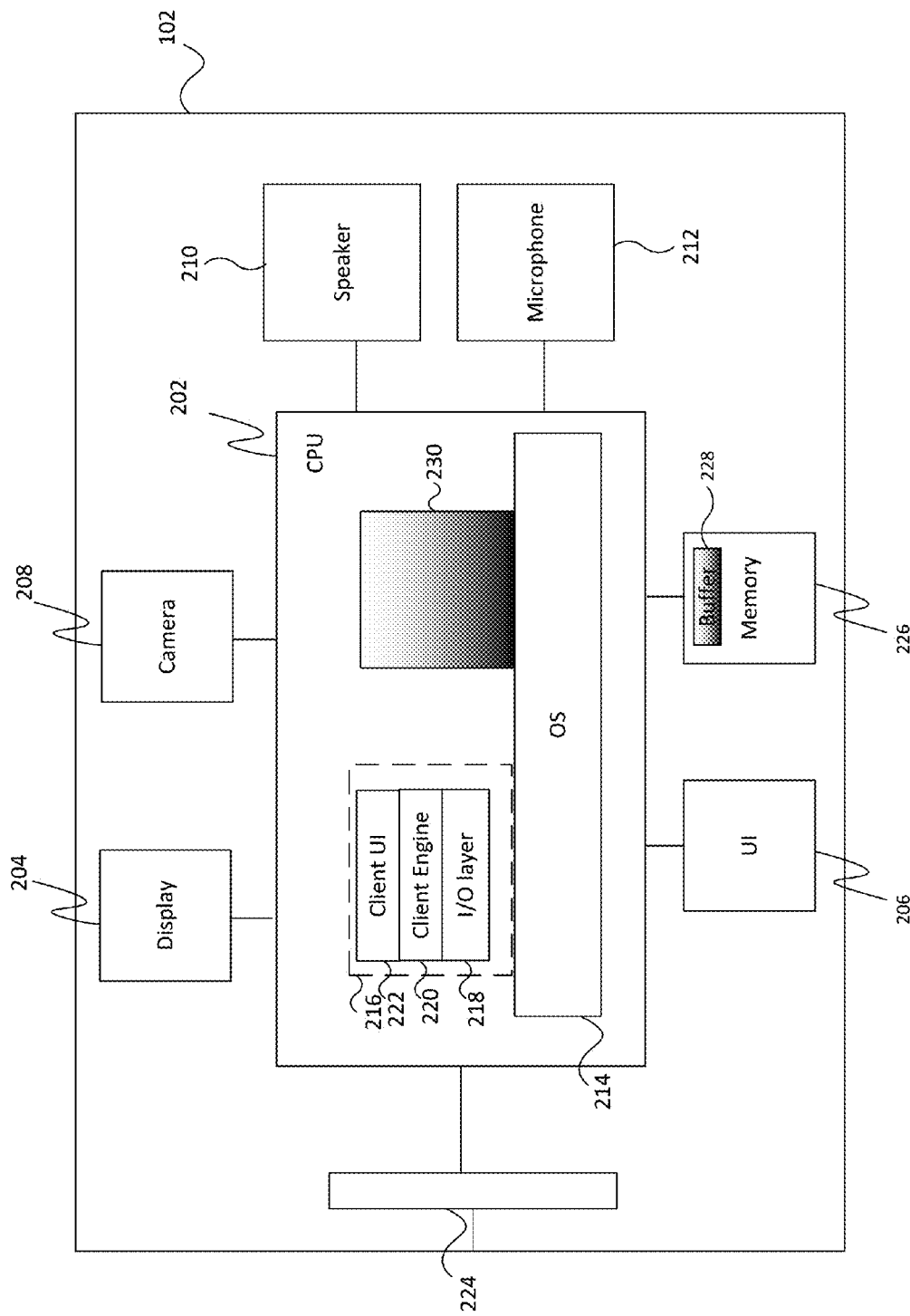
FIG. 2 shows a schematic view of a user device.

FIG. 2 illustrates a schematic view of the user device 102 on which is executed a communication client application for communicating over the communication system 100. The user device 102 comprises a central processing unit ("CPU") 202, to which is connected a display 204 such as a screen or touch screen, input devices such as a user interface 206 (for example a keypad), a camera 208, and touch screen 204.

In some embodiments the user interface 206 may be a keypad, keyboard, mouse, pointing device, touchpad or similar. However the user interface 206 may be any suitable user interface input device, for example gesture or motion control user input, head-tracking or eye-tracking user input. Furthermore the user interface 206 in some embodiments may be a 'touch' or 'proximity' detecting input configured to determine the proximity of the user to a display 204.

In embodiments described below the camera 208 may be a conventional webcam that is integrated into the user device 102, or coupled to the user device via a wired or wireless connection. Alternatively, the camera 208 may be a depth-aware camera such as a time of flight or structured light camera. Furthermore the camera 208 may comprise multiple image capturing elements. The image capturing elements may be located at different positions or directed with differing points or view such that images from each of the image capturing elements may be processed or combined. For example the image capturing elements images may be compared in order to determine depth or object distance from the images based on the parallax errors. Furthermore in some examples the images may be combined to produce an image with a greater resolution or greater angle of view than would be possible from a single image capturing element image.

An output audio device 210 (e.g. a speaker, speakers, headphones, earpieces) and an input audio device 212 (e.g. a microphone, or microphones) are connected to the CPU 202. The display 204, user interface 206, camera 208, output audio device 210 and input audio device 212 may be integrated into the user device 102 as shown in FIG. 2. In alternative user devices one or more of the display 204, the user interface 206, the camera 208, the output audio device 210 and the input audio device 212 may not be integrated into the user device 102 and may be connected to the CPU 202 via respective interfaces. One example of such an interface is a USB interface.

The CPU 202 is connected to a network interface 224 such as a modem for communication with the communication network 106. The network interface 224 may be integrated into the user device 102 as shown in FIG. 2. In alternative user devices the network interface 224 is not integrated into the user device 102. The user device 102 also comprises a memory 226 for storing data as is known in the art. The memory 226 may be a permanent memory, such as ROM. The memory 226 may alternatively be a temporary memory, such as RAM.

The user device 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user devices of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user device 102 via the user interface of the communication client application 112 which is displayed on the display 204 and to receive information from the user of the user device 102 via the user interface.

Also running on top of the OS 214 are further applications 230. Embodiments are described below with reference to the further applications 230 and communication client application 112 being separate applications, however the functionality of the further applications 230 described in more detail below can be incorporated into the communication client application 112.

Figure 3:
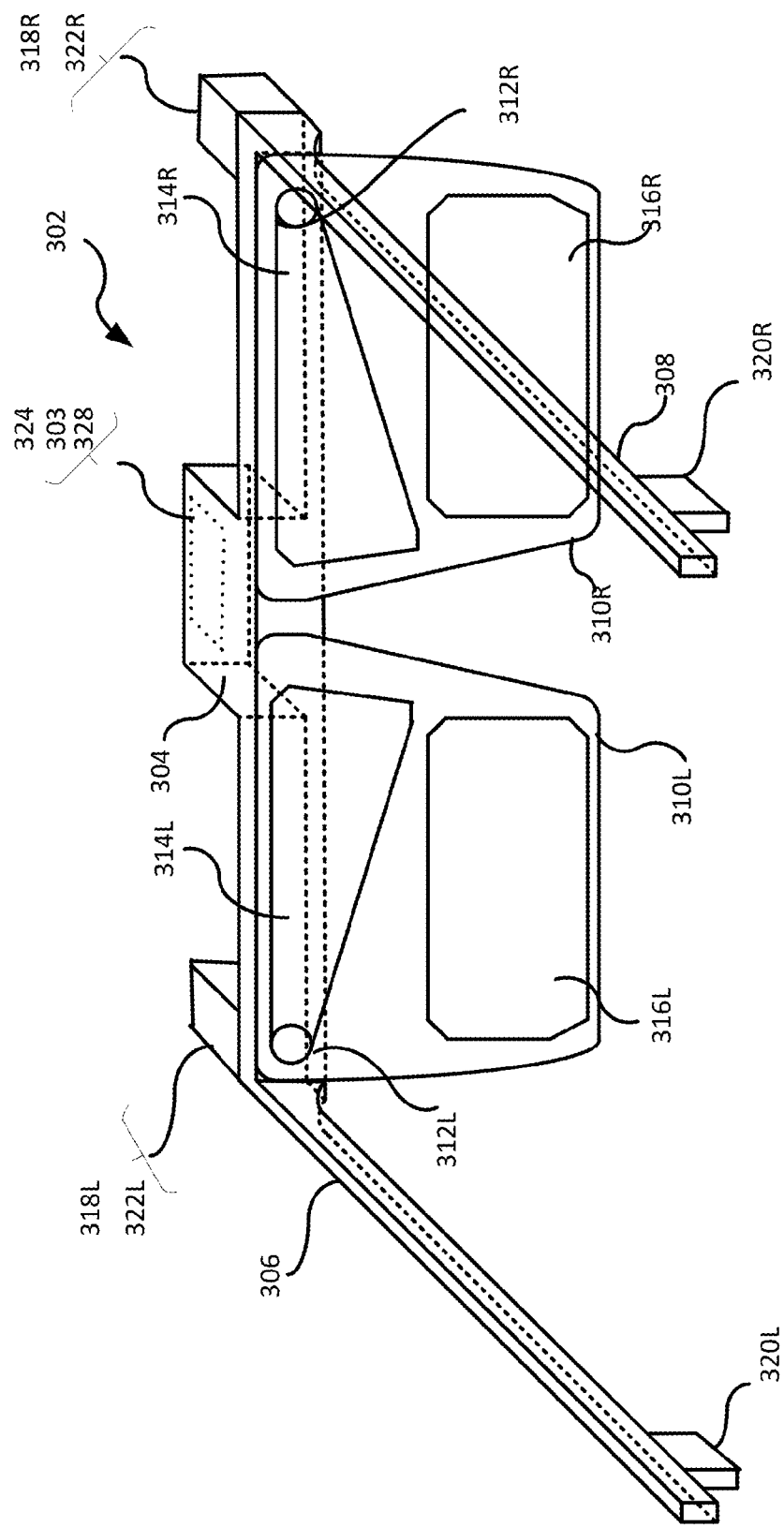
FIG. 3 shows a schematic view of a user device as a wearable headset.

In one embodiment, shown in FIG. 3, the user device 102 is in the form of a headset or head mounted user device. The head mounted user device comprises a frame 302 having a central portion 304 intended to fit over the nose bridge of a wearer, and a left and right supporting extensions 306, 308 which are intended to fit over a user's ears. Although the supporting extensions 306, 308 are shown to be substantially straight, they could terminate with curved parts to more comfortably fit over the ears in the manner of conventional spectacles.

The frame 302 supports left and right optical components, labelled 310L and 310R, which may be waveguides e.g. formed of glass or polymer.

The central portion 304 may house the CPU 303, memory 328 and network interface 324 such as described in FIG. 2. Furthermore the frame 302 may house a light engines in the form of micro displays and imaging optics in the form of convex lenses and a collimating lenses. The light engine may in some embodiments comprise a further processor or employ the CPU 303 to generate an image for the micro displays. The micro displays can be any type of light of image source, such as liquid crystal display (LCD), backlit LCD, matrix arrays of LEDs (whether organic or inorganic) and any other suitable display. The displays may be driven by circuitry which activates individual pixels of the display to generate an image. The substantially collimated light from each display is output or coupled into each optical component, 310L, 310R by a respective in-coupling zone 312L, 312R provided on each component. In-coupled light may then be guided, through a mechanism that involves diffraction and TIR, laterally of the optical component in a respective intermediate (fold) zone 314L, 314R, and also downward into a respective exit zone 316L, 316R where it exits towards the users' eye.

The optical component 310 may be substantially transparent such that a user can not only view the image from the light engine, but also can view a real world view through the optical components.

The optical components may have a refractive index n which is such that total internal reflection takes place to guide the beam from the light engine along the intermediate expansion zone 314, and down towards the exit zone 316.

The user device 102 in the form of the headset or head mounted device may also comprise at least one camera configured to capture the field of view of the user wearing the headset. For example the headset shown in FIG. 3 comprises stereo cameras 318L and 318R configured to capture an approximate view (or field of view) from the user's left and right eyes respectfully. In some embodiments one camera may be configured to capture a suitable video image and a further camera or range sensing sensor configured to capture or determine the distance from the user to objects in the environment of the user.

Similarly the user device 102 in the form of the headset may comprise multiple microphones mounted on the frame 306 of the headset. The example shown in FIG. 3 shows a left microphone 322L and a right microphone 322R located at the 'front' ends of the supporting extensions or arms 306 and 308 respectively. The supporting extensions or arms 306 and 308 may furthermore comprise 'left' and 'right' channel speakers, earpiece or other audio output transducers. For example the headset shown in FIG. 3 comprises a pair of bone conduction audio transducers 320L and 320R functioning as left and right audio channel output speakers.

The concepts are described herein with respect to a mixed reality (MR) application, however in other embodiments the same concepts may be applied to any single or multiple party communication application. Mixed reality applications may for example involve the sharing of a scene, wherein a device comprising a camera is configured to capture an image or video and transmit this image or images to other devices. Furthermore the image or video may be augmented or annotated by the addition, deletion and interaction of objects. These objects or virtual objects can be 'placed' within the image scene and may have a visual representation which can be 'seen' and interacted with by the participants (including the scene owner). Objects may be defined not only by position but comprise other attributes, such as object type and state. The objects, for example, may have associated content such as audio/image/video/text content. A participant may, for example, attempt to communicate with the scene owner and/or other participants and place an audio/video object in the shared scene. The same participant may then capture video and audio data and associate the video and audio data with the object and transmit the object information and the audio/video data to the participants in the shared scene for all participants to watch/listen to. In some embodiments the scene owner may furthermore define and place objects within scene generated by the user device without needing to share the scene. For example the user of the user device may place an object with associated audio or video and audio data content within the scene and then interact with the object to enable the associated audio or video and audio data content to be presented to the user.

The placement of the object may be made with respect to the scene and furthermore a three dimensional representation of the scene. In order to enable accurate placement of the object to be represented or rendered on a remote device surface reproduction (SR) or mesh data associated with the scene may be passed to all of the participants of the shared scene.

Figure 4A:
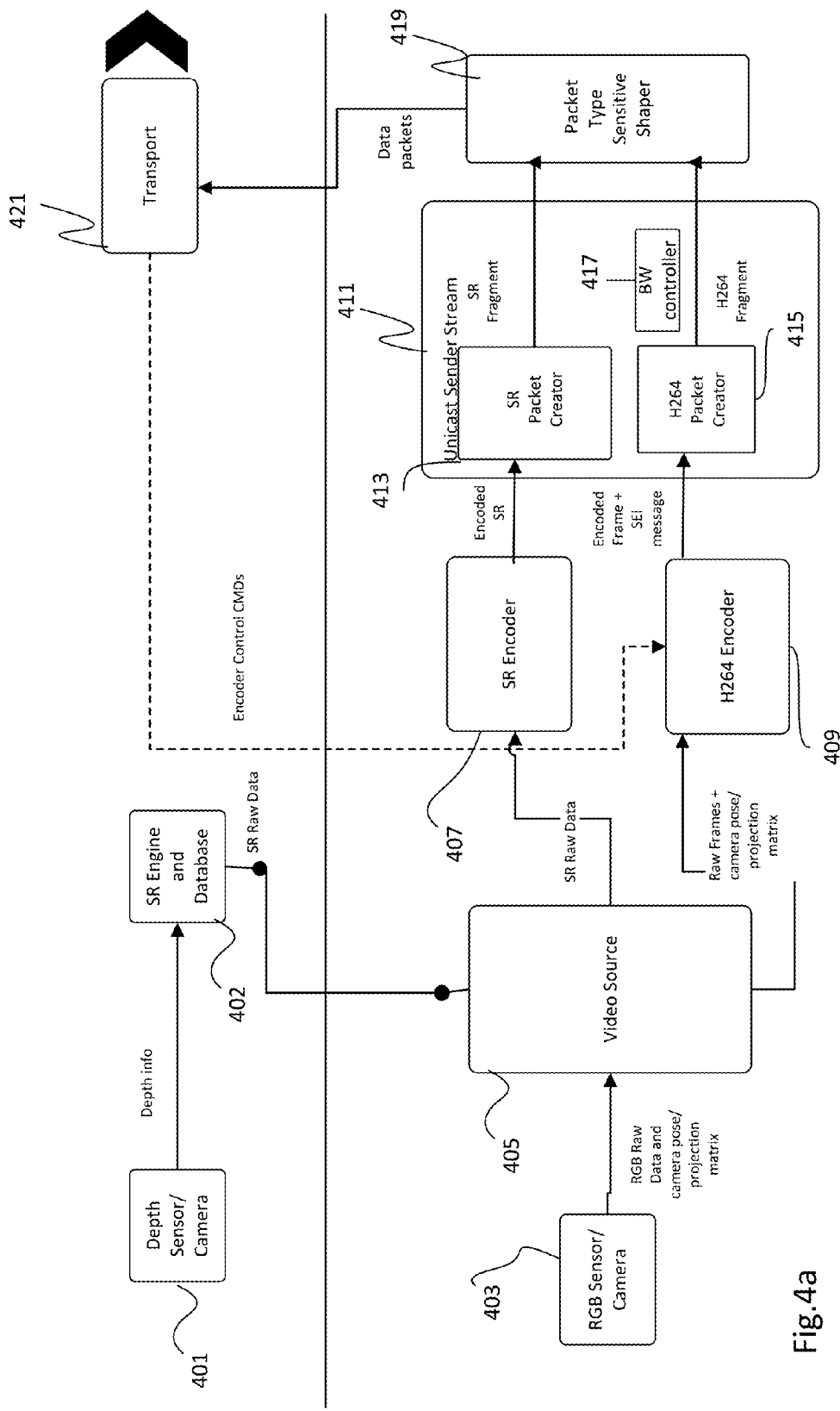
FIGS. 4a and 4b show a schematic view of an example sender and receiver pipeline for combined video and surface reconstruction (SR) data.

With respect to FIG. 4a an example of a suitable sending (media stack) pipeline architecture for the user device. The user device may in such embodiments as described herein be configured to generate image (video data) and surface reproduction (SR) or mesh data.

In the example shown the image used to generate the shared scene is captured by a (Red-Green-Blue) RGB sensor/camera 403. The RGB sensor/camera 403 may be configured to pass the captured RGB raw data and furthermore pass any camera pose/projection matrix information to a suitable device video source 405.

The example architecture shown in FIG. 4a furthermore comprises a depth sensor/camera 401 configured to capture depth information which can be passed to a surface reproduction (SR) engine and database 402. The SR engine and database 402 may be configured to receive the depth information and generate SR raw data according to a known mesh/SR method. The SR raw data can then be passed to the device video source 405.

The video source 405 may be configured to receive the SR raw data and the RGB raw data and any camera pose/projection matrix information. Furthermore the video source 405 may be configured to output the SR raw data to a suitable SR channel encoder 407 and the video image data in terms of raw frame and camera pose/projection matrix data to a suitable H.264 channel encoder 409. In the examples described herein the H.264 channel encoder 409 is an example of a suitable video encoder. It is understood that in some other embodiments the video codec employed is any suitable codec. For example the encoder and decoder may employ a High Efficiency Video Coding HEVC implementation.

The SR channel encoder 407 may be configured to receive and to encode the SR raw data to generate suitable encoded SR data. The SR channel encoder 407 may then be configured to pass the encoded SR data to a packet generator 411. Specifically the encoded data may be passed to a SR packet creator 413.

The H.264 channel encoder 409 may similarly be configured to receive the raw image/video frames and camera pose/projection matrix data and process these to generate an encoded frame and SEI (supplemental enhancement information) message data. The encoded frame and SEI message data may be passed to the packet generator 411 and specifically to a H.264 packet creator 415.

The concept associated with the packet generator 411 is to control the packaging of the video and the SR data in order that the receiver of the data is able to produce a reliable and effective mixed reality experience.

The packet generator 411 may for example comprise a SR packet creator 413. The SR packet creator 413 may be configured to generate SR fragment packets which can be passed to the packet type sensitive shaper 419. The SR packet creator 413 furthermore may be controlled for retransmission feedback purposes. In some embodiments using a NACK method for retransmission feedback may not be suitable and therefore an ACK method may be implemented.

The SR packet creator 413 may therefore in some embodiments be configured to hold references of any SR data packets in a pending buffer until they are sent. Once the packets are sent, the references may then be moved to an unacknowledged buffer.

In such embodiments the unacknowledged buffer may have a window size that limits the traffic between sender and receiver.

The references of the SR data packets may then be maintained until the receiver acknowledges that the packets are received.

In some embodiments the unacknowledged buffer window size may be dynamically adjusted according to receiver buffer depth. In some embodiments the unacknowledged buffer window size may be a static value, for example 32.

In some embodiments the SR packet creator 413 may be configured to keep sending SR data packets from the pending buffer when the SR frame arrives, even when there is no feedback message (for example a message comprising an AcknowledgmentBitMap) received. Implementing a keep sending method means that starvation at the receiver should not occur.

The feedback message may comprise a value (for example a value baseSequence in the AcknowledgmentBitMap message). An increasing value implies that all packets up to and including value-1 (baseSequence—1) have been acknowledged by the receiver.

In some embodiments the SR packet creator 413 may be configured to send data packets beyond a learned receiver buffer depth only when there is enough bandwidth.

In some embodiments the sending speed may be limited by a RTT (round trip time) of the two way channel. For example when the unacknowledged buffer window size is 128 packets, and the RTT is 200 ms, and the MPU (Maximum Packet Unit applied to SR data fragmentation) is 1000, then the maximum sending speed would be limited to 128*1000*(1000/200)=5000 kb/s.

Thus in some embodiments the unacknowledged buffer window size, along with length of the (AcknowledgmentBitMap) feedback message may be adjusted to change the maximum rate.

Similarly the packet generator 411 may comprise a H.264 packet creator 415. The H.264 packet creator 415 may be configured to generate suitable H.264 packet fragments and pass these packet fragments to the packet type sensitive shaper 419.

The packet generator 411 may furthermore comprise a bandwidth (BW) controller 417 configured to control the generation and output of the packet fragments. The BW controller 417 may be responsible for splitting bandwidth allocations between the SR packet creator 413 and H.264 packet creator 415. In some embodiments the BW controller 417 maintains a minimum bandwidth of 48 kb/s for video.

In some embodiments the BW controller 417 may be configured to initially allocate data evenly between every parallel channel running concurrently. For example the data split may start at 50/50 for a single H.264 channel and a single SR channel. However the BW controller 417 may be configured to determine or estimate short-term and long-term averages for H.264 and SR bandwidth requirements after a determined time period. For example short-term and long-term averages for the H.264 and SR bandwidth requirements may be determined after 2.5 seconds.

It should be noted that there is a difference in behaviour between these values between the H.264/video and SR bandwidths. For the video the bandwidth values are an allocation which is passed to and should be respected by the H.264 (video) encoder 409. While the SR bandwidth values may be an observation of the bandwidth used by the SR channel and which the media platform may monitor to determine how to adjust a level-of-detail parameter within the SR encoder 407.

The packet sensitive shaper 419 may then be configured to receive the SR packet fragments and H.264 packet fragments and generate suitable data packets which are passed to the transport 421. The packet sensitive shaper 419 may be a (network traffic) shaper that is aware of different real-time requirement of H.264 and SR data packets. For example the shaper may be implemented as a round-robin between H.264 and SR packets.

The transport 421 receives the data packets and outputs of these via a suitable output stream.

Figure 4B:
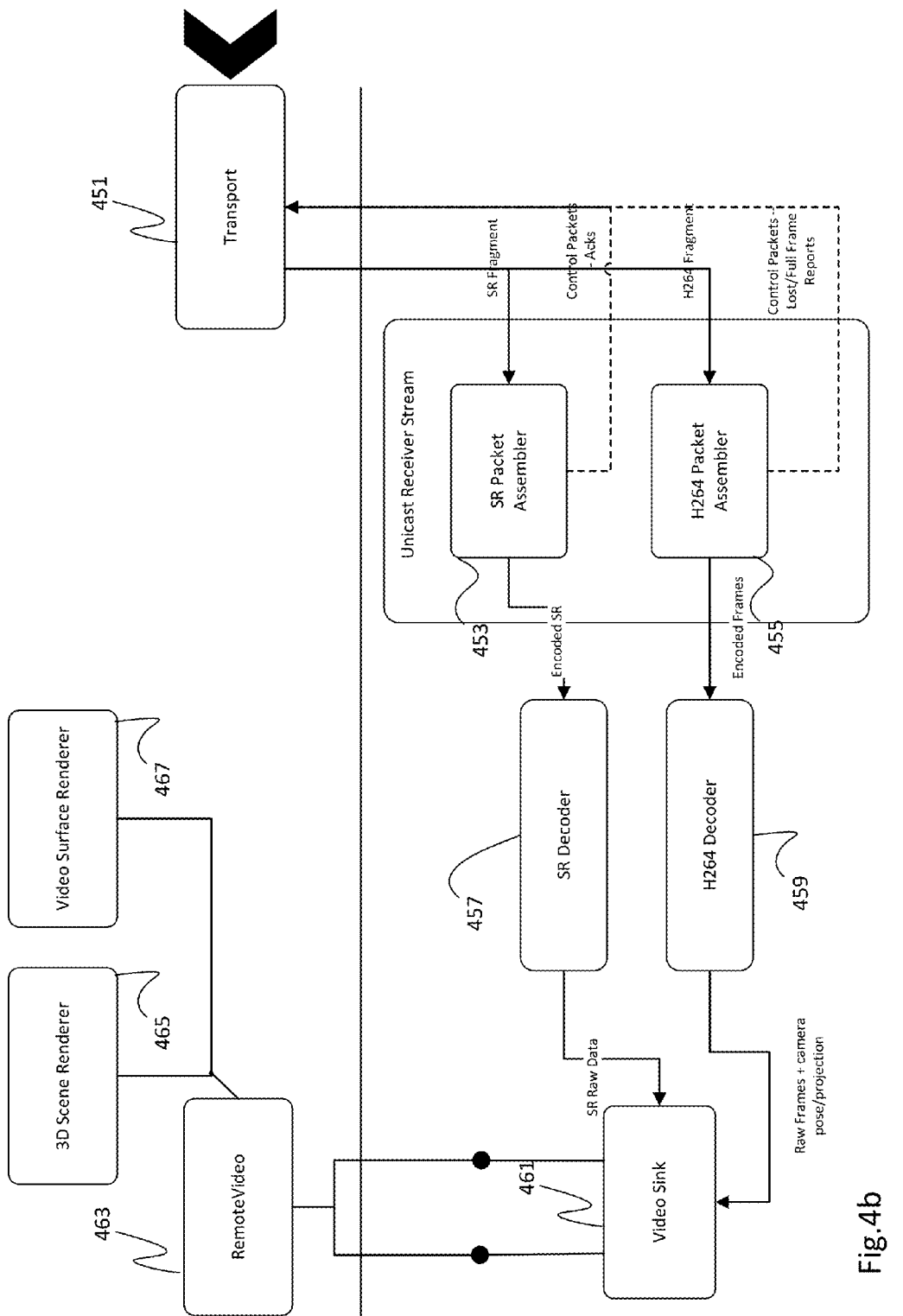

With respect to FIG. 4b a suitable receive pipeline (media stack) architecture for the user device configured to receive image (video data) and surface reproduction (SR) or mesh data is shown.

The user device may comprise a transport 451 convicted to receive the video stream data and pass this information to a receiver/packet assembler.

The packet assembler may comprise a SR packet assembler 453 and a H.264 packet assembler 455. The SR packet fragments may be passed to the SR packet assembler 453 for generating encoded SR data packets. The H.264 packet assembler 455 may be configured to receive the H.264 packet fragments and generate encoded frame data.

The SR packet assembler 453 may be configured to generate a suitable feedback message (for example an AcknowledgmentBitMap feedback message) which may be sent to the SR packet creator in order to control the retransmission of the SR data. The feedback message may be generated when a content start event is detected (for example when the SR1_CONTENT_START_FLAG is detected), or when a content stop event is detected (for example when the SR1_CONTENT_STOP_FLAG is detected), or when an end of file event is detected (for example when the SR1_CONTENT_EOF_FLAG is detected). Furthermore in some embodiments the feedback message is generated when a new SR packet arrives at SR packet assembler 453 and a predetermined time period (for example 250 ms) has passed since the previous packet. In some embodiments the feedback message is generated for every 7th (or other determined number) received packet. In some embodiments the determined number of packet may include retransmitted packets. Furthermore in some embodiments the feedback message may be generated after the feedback value indicating the last received packet (baseSequence) has advanced by a determined number (for example 7) packets. In some embodiments the feedback message is generated when an error is reported by a SR channel decoder 457.

As described herein the SR packet creator is configured to receive the feedback message (AcknowledgmentBitMap) and control the retransmission of buffered packets.

The encoded SR data packets may then be passed to a SR channel decoder 457 to generate SR raw data.

The H.264 channel decoder 459 may be configured to receive the encoded frames from the H.264 packet assembler 455 and output suitable raw frames and camera pose/projection matrix data. The SR raw data and the raw frames and camera pose/projection data can then be passed to a video sink 461.

The video sink 461 may be configured to output the received SR raw data and the raw frames and camera pose/projection data to any suitable remote video applications 463 or libraries for suitable 3D scene rendering (at a 3D scene renderer 465) and video service rendering (at a video surface renderer 467).

Furthermore any data received via the transport 451 with regards to objects or annotations can be passed to a suitable object protocol entity, for example an object update message decoder and may be passed to a suitable annotation or object renderer.

As has been described herein an object can be associated with an audio data or audio source. For example a user (scene owner) wearing a headset may create a shared scene environment comprising video data and mesh (or surface recreation SR data). Into this shared scene may be inserted an object such as an audio or video incoming call object which can be placed or pinned at a location within the shared scene.

When the object is within the field of view of the user (scene owner) the audio signal can be rendered to the user in any suitable manner for the relative position of the object is visible and therefore easily determined by the user. However when the user (scene owner) moves or turns their head and the object leaves the field of view of the user (leaves the visible shared scene) it may be disorientating for the user to continue to hear the audio source coming as if from the position in front of the user. Furthermore once an object leaves the field of view of the user (scene owner) it may be difficult for the user to find the object without searching around the user. This (rapid) searching motion of the head of the scene owner may generate video images which could be disorientating for other participants or observers of the shared scene.

The concept as described herein is to enable spatial audio signal processing to be performed on an audio signal associated with the object in such a manner that the audio signal appears to come from the approximate position of the object. This may be implemented for example by applying a suitable head related transfer function (HRTF) to an audio signal in the audio pipeline to produce a spatial output before being passed to the sound card and output. In some embodiments the spatial audio signal processing may be applied to the audio signal associated with an object when the object is outside the visible shared scene only.

In the following examples the relative position and/or orientation between the user (or listener) and the object (or audio source) may be approximated or substantially defined by the relative position and/or orientation between the user device worn by the user and the object. It is understood that the relative position and/or orientation between the user (or listener) and the object (or audio source) may furthermore in some embodiments be determined as the relative position and/or orientation between the user device worn by the user and the object, and a determined position and/or orientation error or offset (which reflects the difference between the user device and the user's 'center of hearing'.

Figure 5:
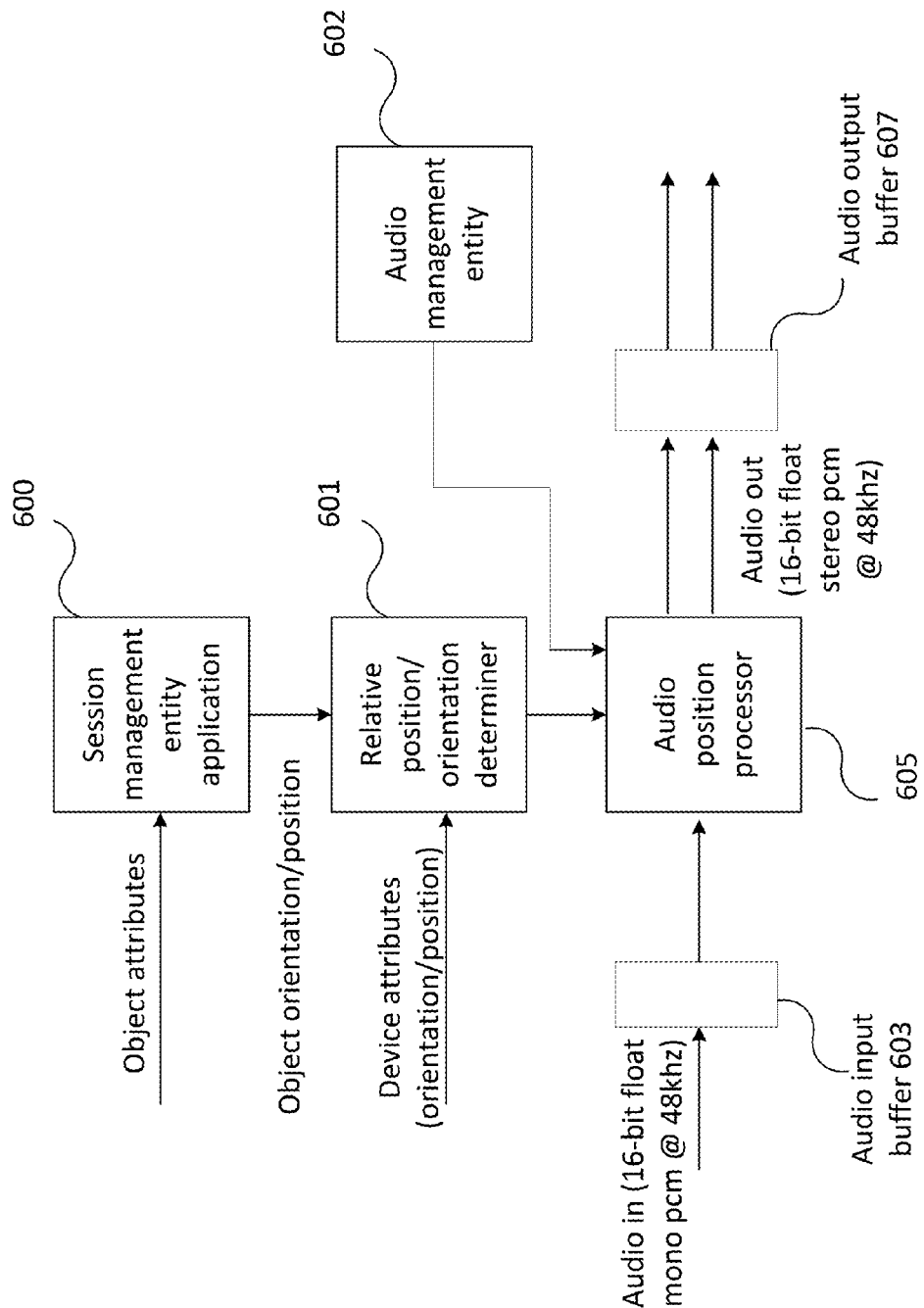
FIG. 5 shows a schematic view of an example architecture for spatial audio signal processing for an object with associated audio data content.

With respect to FIG. 5 example entities and applications for the position or spatial processing of objects with associated audio data according to some embodiments are shown. In this example a session management entity application 600 is employed to receive or maintain object attributes such as object position/orientation, and/or other attributes such as the object type and object status. The session management entity application 600 may in some embodiments be configured to output the object position and/or orientation to a relative position/orientation determiner 601.

The example as shown in FIG. 5 further may comprise a relative position/orientation determiner 601. The relative position/orientation determiner 601 may be configured to maintain or receive the object position and/or orientation information from the session management entity application 600. The relative position determiner 601 may furthermore be configured to receive user device attributes such as orientation and/or position. The relative position determiner 601 may furthermore be configured to receive other parameters such as the user device's field of view, and the determined or estimated position and/or orientation error or offset information. The relative position determiner 601 may thus in some embodiments be configured to generate a relative listener-source position/orientation defining the spatial relationship between the user device (listener) and the object (source). The spatial relationship in some embodiments may be based on or defined by the relative direction (orientation) from the user device to the object or may be defined by both a relative direction (orientation) and a 'distance' between the user device and the object. Furthermore in some embodiments the relative position determiner 600 may be configured to determine whether (or not) the relative position/orientation between the listener-source means that the object is within the field of view of the user device camera. In other words the relative position determiner 600 may be configured to determine whether the object is within the current viewable or observable shared scene.

This information may then be passed to an audio position processor (or spatial signal processor) 605.

In the example shown in FIG. 5 there may further comprise an audio management entity 602. The audio management entity 602 may be configured to maintain or store audio processing parameters. For example the audio management entity may store initialisation information indicating the required output format (for example stereo, multi-channel, 5.1 channel output.) Furthermore the audio management entity may store information such as initialisation parameters such as personalised HRTF's directivity patterns for the source and/or listener, and reverberation settings. The audio management entity 602 may be configured to output these parameters to the audio position processor 605.

The example shown in FIG. 5 may further comprise an audio input buffer 603. The audio input buffer 603 may be configured to receive audio frames and buffer the audio frames prior to processing. In the example shown here in the audio input signal stream is a 16 bit floating point mono channel PCM encoded audio signal sampled at 48 kHz. However it is understood that the audio input may be any suitable audio input format. Furthermore it is understood that although for simplicity the examples shown and described herein feature a single object and audio data associated with the object that the methods and apparatus may be configured to process multiple objects and audio signals. In such embodiments the output of each of the audio signals may be combined to generate a combined processed object audio signal.

The audio input buffer 603 may be convicted to pass the input audio signal to the audio position processor 605. The example shown in FIG. 5 further comprises an audio position processor 605 (or audio signal processor or spatial audio signal processor). In such embodiments the audio position processor 605 may be configured to receive the input audio signal from the audio input buffer 603, the relative position/orientation information from the relative position/orientation determiner 601 and the configuration data from the audio management entity 602. The audio position processor 605 may then generate a suitable processed audio signal output. For example in some embodiments the audio position processor may be configured to apply a head related transfer function (HRTF) using the relative position/orientation information as an input parameter to generate multiple audio output channels from a mono audio input channel. In the example described herein the audio positional processor 605 may generate a 16 bit floating point stereo PCM audio signals sampled at 48 kHz to an audio output buffer 607. In the example shown herein the audio position processor 605 uses a HRTF to generate the multiple channel audio output signals. However any suitable spatial processing application may be employed to generate the audio signals. For example the spatial processing may be amplitude panning or mapping of the mono audio signal to the output channels.

The example shown in FIG. 5 furthermore comprises an audio output 607 configured to receive the audio signals output from the audio position processor 605, buffer and output the audio to a suitable audio output entity, for example a soundcard within a personal computer or similar digital-to-analogue conversion entity.

Figure 6:
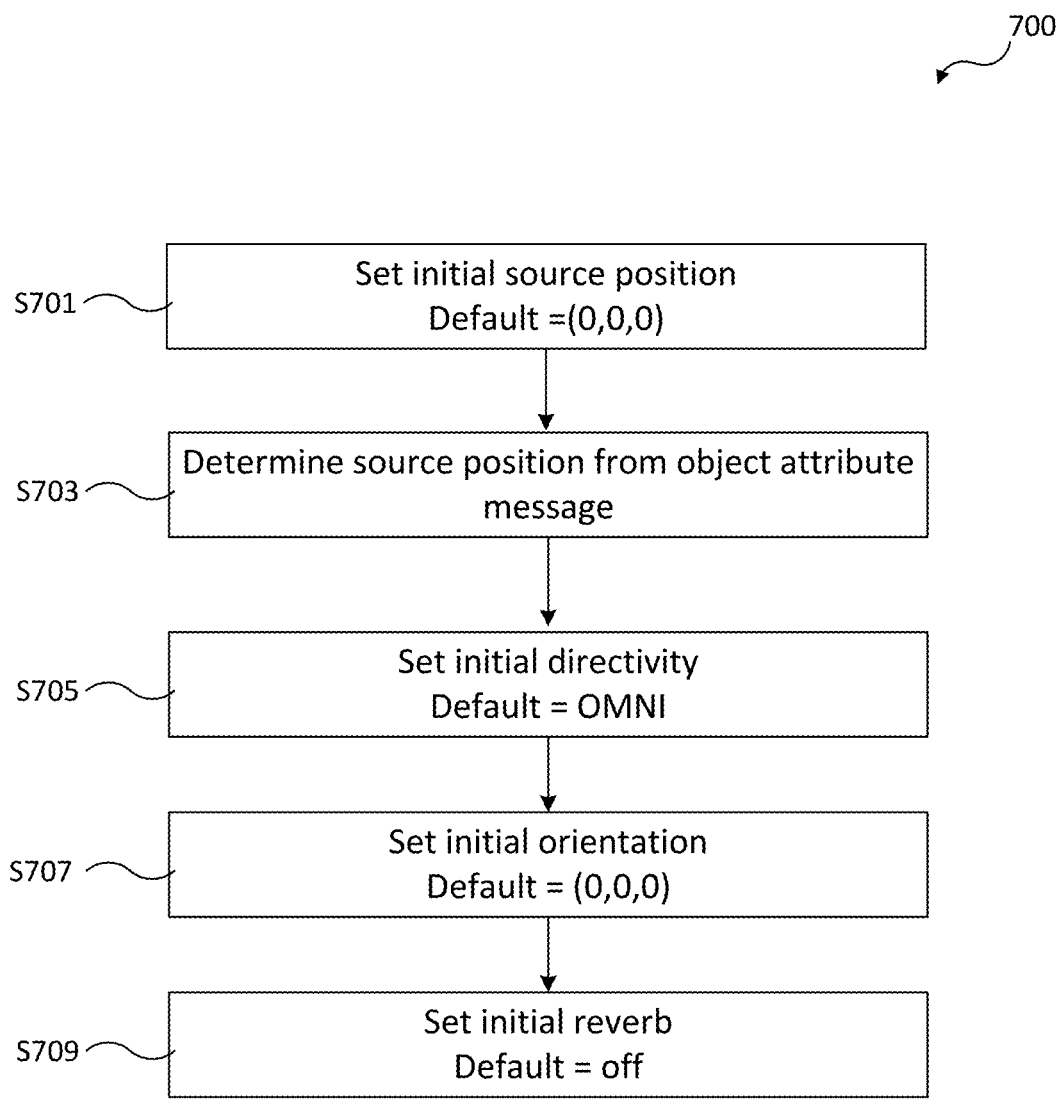
FIG. 6 shows a flow chart for an initialization process for spatial audio signal processing for an object with associated audio data content.

With respect to FIG. 6 a flow diagram 700 of an example initialization process associated with the example implement patient shown in FIG. 5 is described. The initialization process may for example start with the setting of an initial source position. This initial source position may be a default object position stored within the audio management entity 602. In some examples of the initial source position can default to an initial coordinate system of (0,0,0).

The operation of setting an initial source position is shown in FIG. 6 by step S701.

The session management entity application 600 may furthermore determine a source position from an object attribute message.

The operation of determining a source position from an object attribute message is shown in FIG. 6 by step S703.

Furthermore the method may further set an initial directivity for the source and/or the listener. The default directivity may be 'omnidirectional', in other words the source and/or listener does not require spatial filtering and has no 'favoured' direction.

The operation of setting an initial directivity is shown in FIG. 6 by step S705.

Furthermore the method may require the setting of an initial default orientation of the listener. The initial or default setting of orientation of the listener may be the default position/orientation of (0,0,0). In other words the source and the listener are initialized as being co-located.

The operation of setting an initial orientation is shown in FIG. 6 by step S707.

Furthermore the method may further describe the setting of an initial reverb setting for processing. The default setting for reverb may be 'off' as in no reverberation is to be applied to the input audio signal.

The operation of setting an initial reverb setting is shown in FIG. 6 by step S709.

Figure 7:
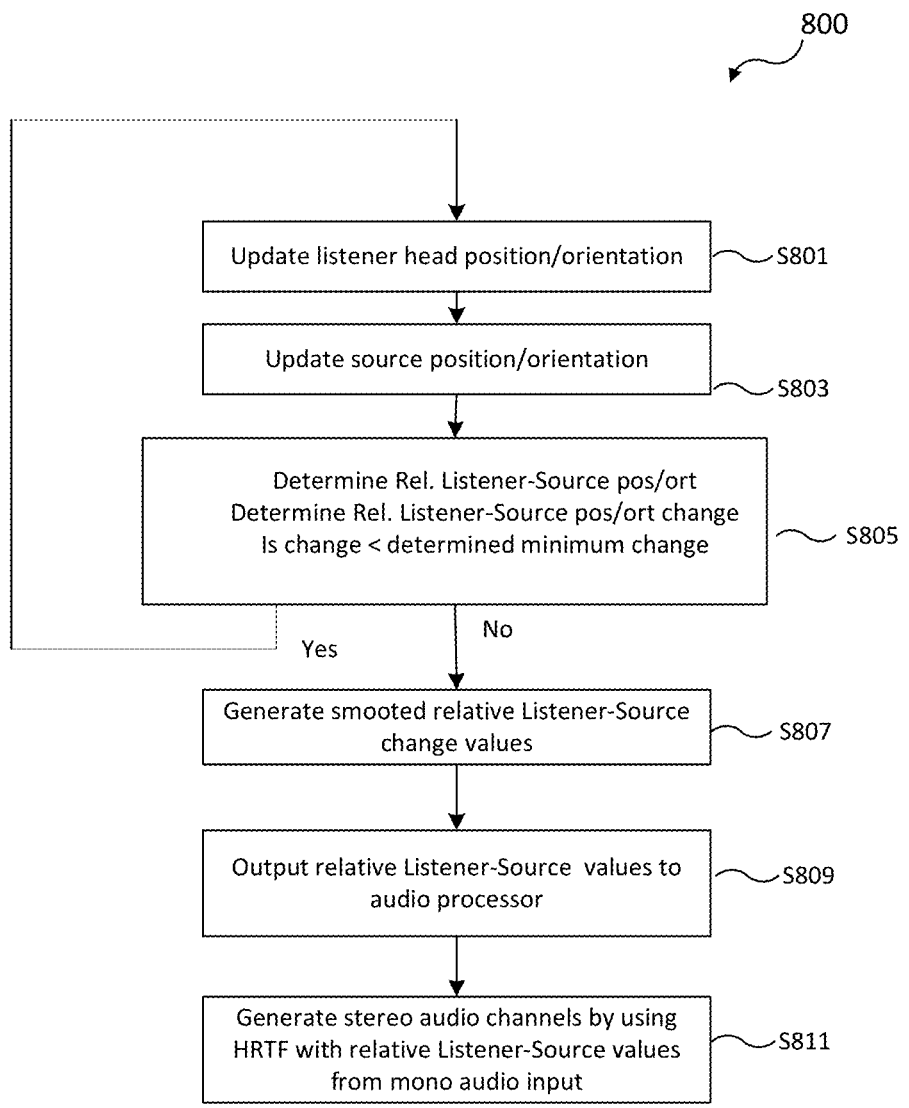
FIG. 7 shows a flow chart for an example process for spatial audio signal processing for an object with associated audio data content.

With respect to FIG. 7 a flowchart 800 is shown of the example operations of the spatial audio signal processing method described with respect to the apparatus shown in FIG. 5.

The relative position determiner may be configured to update a user device and therefore approximately the listener's (the user or scene owner) head position/orientation. This information may be for example be received from the user device positioning determining sensors or entities such as digital compass or positional estimator.

The operation of updating the listeners head position/orientation is shown in FIG. 7 by step S801.

Furthermore the relative position determiner 601 may be configured to update the source (object) position/orientation. The source position/orientation information may for example be received from the session management entity application 600 and the object attribute values.

The operation of updating the source position/orientation is shown in FIG. 7 by step S803.

In some embodiments of the relative position determiner 601 may be configured to determine a listener-source position/orientation. This may, as described herein, be defined as an orientation from the listener to the source or as an orientation and distance value. In some embodiments the relative position determiner may be further configured to determine a change in the relative listener-source position/rotation between frames of audio signals (or between another determined period).

In some embodiments the relative position determiner 601 may be further configured to determine whether the change is less than a determined minimum change (for example 3° of rotation). When the change is less than the determined minimum change then no processing or change in processing is performed.

Furthermore in some embodiments the relative position determiner 601 may be configured to determine that when the relative listener-source position/orientation is such that the source is still within the field of view of the user of the device then no further processing or change of processing is performed and the operation loops back to updating the listener and source position/orientation values.

The operation of determining the relative listener-source position/orientation, determining the relative listener-source position/orientation change, and determining whether the change is less than a determined minimum change (and furthermore whether of the relative listener-source position/rotation is still within the field of view or not) is shown in FIG. 7 by step S805.

In some embodiments when the change is greater than a determined minimum change (and in some embodiments when the relative listener-source position/orientation value is outside the field of view of the user device) then a smoothed relative listener-source position/orientation value is determined. In some embodiments this smoothed value can be generated by a linear interpolation of the old and new listener-source position/orientations and may be applied over subsequent frames of audio data. Similarly the smoothed values may be generated by applying a suitable low pass filter to the relative listener-source position/orientation values.

The operation of generating smoothed relative listener-source values is shown in FIG. 7 by step S807.

The smoothed relative listener-source values can then be output to the audio position processor 605.

The operation of outputting the smoothed relative listener-source values to the audio position processor is shown in FIG. 7 by step S809.

The audio position processor 605 may then receive the audio input signals and apply suitable head related transfer function processing using the relative listener-source values as the input parameter to the HRTF to generate suitable audio channel outputs. For example the audio position processor 605 may generate stereo audio channels from the mono input audio channel.

The process of generating stereo (multiple) audio channels from a mono audio channel using the head related transfer function is a known method and not described in any further detail herein.

The operation of generating stereo or multichannel audio signals using a HRTF with relative listener-source values is shown in FIG. 7 by step S811.

It is understood that in some devices the client handling the object and the associated audio signal processing may be switched to other clients which may not require spatial audio signal processing. For example the user of the user device may switch between a telephone or conference call using an object such as described herein to an internet browser client. It is understood that the audio associated with the browser client should not necessarily be spatially audio signal processed as this may lead to the user turning their head to the direction of the audio signal in confusion.

Figure 8A:
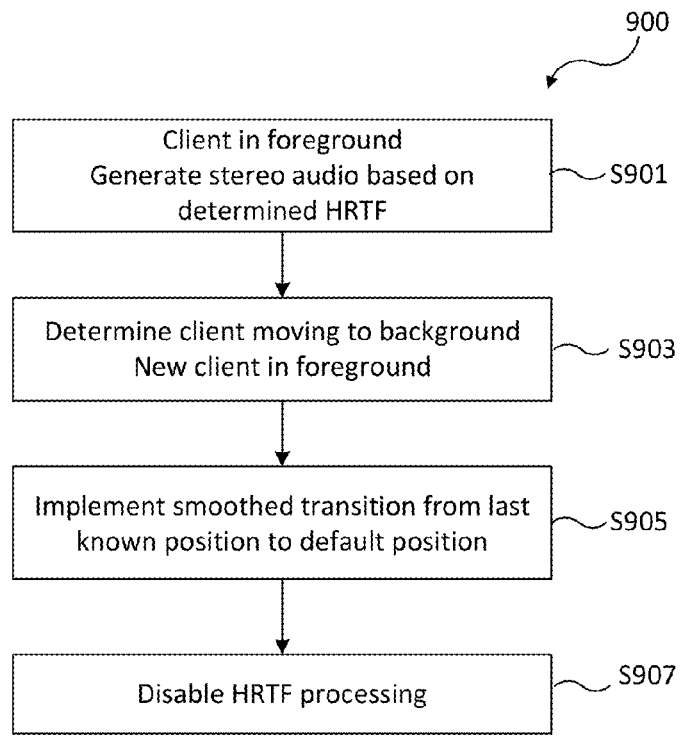
FIGS. 8a and 8b show a flow chart for an example process for switching between spatial audio signal processing for an object with associated audio data content and conventional audio representation of an audio source.
Figure 8B:
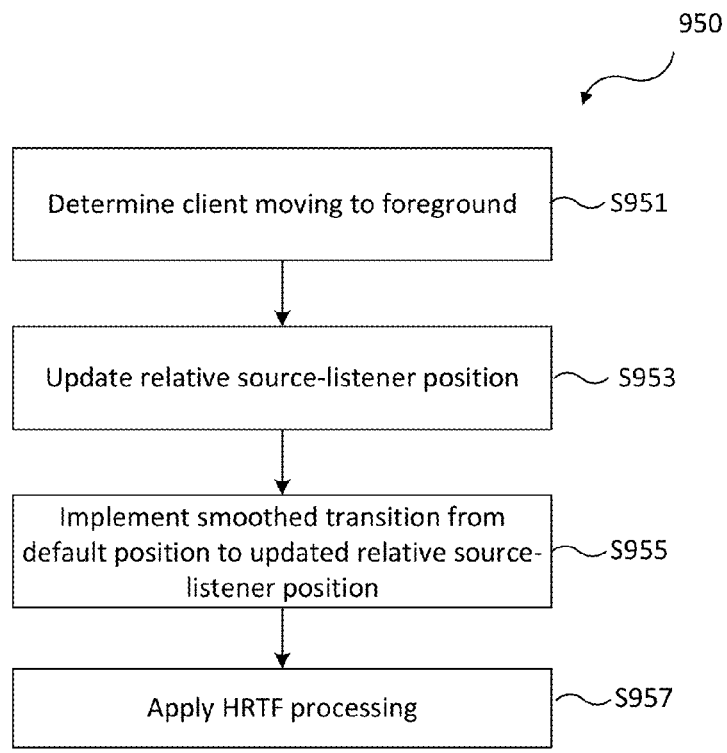

Thus with respect to FIGS. 8a and 8b examples of switching between spatial audio signal processing clients and other clients employing the entities shown in FIG. 5 is described in further detail.

In the example flow diagram 900 shown in FIG. 8 a spatially audio signal processing client is initially in the foreground and the stereo audio channels are generated based on a determined HRTF.

The operation of generating a stereo audio signal based on a determined HRTF when the client is in the foreground is shown in FIG. 8 by step S901.

The relative position determiner 601 may further be configured to determine when the client is being moved to the background.

The operation of determining when the client is being moved to the background is shown in FIG. 8 by step S903.

In some embodiments the relative position determiner 601 may be configured to implement a smooth transition from the last known relative listener-source position/orientation to a default position. This for example may be implemented using a linear interpolation or lowpass filtering between the last relative listener-source position/orientation and default position/orientations.

The operation of implementing a smooth transition between the last known and default relative listener-source position/orientation is shown in FIG. 8 by step S905

Once the smooth transition from the last known relative listener-source position/orientation to the default relative listener-source position/orientation has been performed then the relative position determiner 601 may be configured to disable spatial or HRTF processing.

The operation of disabling HRTF processing is shown in FIG. 8 by step S907.

With respect to FIG. 8b the operation is shown where the spatial processing suitable client moves from the background to the foreground. The flow diagram 950 shows the determination of when the client is moved from the background to the foreground.

The operation of determining that the spatially audio signal processed client is moving to the foreground is shown in FIG. 8b by step S951.

Furthermore the relative position determiner 601 may be configured to update the relative listener-source position/orientation values.

The operation of updating the relative listener-source position/orientation values are shown in FIG. 8b by step S953.

Furthermore the relative position determiner 601 may be configured to implement a smooth transition from the default relative listener-source position/orientation to the updated relative listener-source position/orientation. This may for example be performed using a suitable linear interpolation over a series of frames or using a low pass filtering operation.

The implementation of a smooth transition from the default position to the updated relative listener-source position/orientation is shown in FIG. 8b by step S955.

The audio position processor may then implement HRTF processing based on the smoothed transition values until the relative listener-source position/orientation has been reached.

The operation of implementing HRTF or spatial audio processing based on the smoothed transition values and then continuing the relative listener-source position/orientation processing is shown in FIG. 8b by step S957.

Whilst embodiments have been described with reference to interactions being made by a user to an object located with respect to frames of incoming live video, embodiments of the present disclosure extend to interactions over images generated by a computer.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

There is also provided a user device for generating a scene, the user device comprising: an object determiner configured to determine an object for the scene, the object being associated with at least one audio signal; a relative position/orientation determiner configured to determine a relative position/orientation between the user device's user and the object; and an audio position processor configured to spatially audio signal process the at least one audio signal to generate at least two channel audio signal based on the relative position/orientation.

The audio position processor may be configured to process the at least one audio signal with a head related transfer function with the relative position/orientation as a parameter input for the head related transfer function.

The scene may be a shared scene communicated with at least one further user device over a communications network, and wherein the object may be associated with the at least one further user device, and wherein the at least one audio signal may be a transmitted audio signal from the at least one further user device.

The object may be further associated with a video or image, and the user device may further comprise an object renderer configured to display the video or image at the relative position/orientation.

The relative position/orientation determiner may be configured to: determine over a determined time period a change in the relative position/orientation; determine the change in the relative position/orientation is greater than a determined threshold value; and generate a smoothed relative position/orientation as the relative position/orientation.

The relative position/orientation determiner may be configured to: generate a relative position/orientation outside the user's field of view as the relative position/orientation based on determining the relative position/orientation is outside the user's field of view; and maintain a current position/orientation as the relative position/orientation otherwise.

The relative position/orientation determiner may be configured to: determine the relative position/orientation; determine over a determined time period a change in the relative position/orientation; generate a smoothed relative position/orientation outside the user's field of view as the relative position/orientation based on determining the relative position/orientation is outside the user's field of view and determining the change in the relative position/orientation is greater than a determined threshold value; and maintain a current position/orientation as the relative position/orientation otherwise.

The object determiner may be configured to determine at least one further object, the object being associated with at least one further audio signal; and wherein the relative position/orientation determiner may be configured to determine a transition relative position/orientation based on the determined relative position/orientation and a default relative position/orientation; and the audio position processor may be configured to spatially audio signal process the at least one audio signal to generate at least two channel audio signal based on the transition relative position/orientation.

There is also provided a method implemented at a user device for generating a scene, the method comprising: determining an object for the scene, the object being associated with at least one audio signal; determining a relative position/orientation between the user device's user and the object; and spatially audio signal processing the at least one audio signal to generate at least two channel audio signal based on the relative position/orientation.

Spatially audio signal processing the at least one audio signal may comprise processing the at least one audio signal with a head related transfer function with the relative position/orientation as a parameter input for the head related transfer function.

The scene may be a shared scene communicated with at least one further user device over a communications network, and wherein the object may be associated with the at least one further user device, and wherein the at least one audio signal may be a transmitted audio signal from the at least one further user device.

The object may be further associated with a video or image, and the method may further comprise displaying the video or image at the relative position/orientation.

Determining a relative position/orientation may comprise: determining over a determined time period a change in the relative position/orientation; determining the change in the relative position/orientation is greater than a determined threshold value; and generating a smoothed relative position/orientation as the relative position/orientation.

Determining a relative position/orientation may comprise: generating a relative position/orientation outside the user's field of view as the relative position/orientation based on determining the relative position/orientation is outside the user's field of view; and maintaining a current position/orientation as the relative position/orientation otherwise.

Determining a relative position/orientation may comprise: determining the relative position/orientation; determining over a determined time period a change in the relative position/orientation; generating a smoothed relative position/orientation outside the user's field of view as the relative position/orientation based on determining the relative position/orientation is outside the user's field of view and determining the change in the relative position/orientation is greater than a determined threshold value; and maintaining a current position/orientation as the relative position/orientation otherwise.

The method may further comprise: determining at least one further object, the object being associated with at least one further audio signal; determining a transition relative position/orientation based on the determined relative position/orientation and a default relative position/orientation; spatially audio signal processing the at least one audio signal to generate at least two channel audio signal based on the transition relative position/orientation.

There is also provided a computer program product, the computer program product being embodied on a non-transient computer-readable medium and configured so as when executed on a processor of a user device for generating a scene, to: determine an object for the scene, the object being associated with at least one audio signal; determine a relative position/orientation between the user device's user and the object; and spatially audio signal process the at least one audio signal to generate at least two channel audio signal based on the relative position/orientation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device for generating a scene, the user device comprising:
   at least one image capturing device configured to capture video of an area within a field of view of a user wearing the user device, the user device being a head-mountable device;
   an object determiner configured to determine a virtual object for the scene, the virtual object being associated with at least one audio signal, the scene being a shared mixed-reality scene environment representing the captured video of the area within the field of view of the user wearing the user device combined with the virtual object;
   one or more components configured to communicate the shared mixed-reality scene environment to a device of at least one additional user over a communications network, the shared mixed-reality scene environment enabling one or more of a functional attribute or a positional attribute of the virtual object to be controlled by the user and the at least one additional user;
   a relative position/orientation determiner configured to:
      determine a relative object position and orientation of the virtual object relative to a device position and orientation of the user device;
      determine over a determined time period a change in the relative object position and orientation;
      determine that the virtual object has moved outside the field of view based on the change in the relative object position and orientation being greater than a determined threshold value; and
      generate a smoothed relative object position and orientation outside the field of view as the relative object position and orientation based on a determination that the virtual object has moved outside the field of view; and
   an audio position processor configured to spatially audio signal process the at least one audio signal to generate at least a two channel audio signal based on the relative object position and orientation.

2. The user device of claim 1, wherein the audio position processor is configured to process the at least one audio signal with a head related transfer function with the relative object position and orientation as a parameter input for the head related transfer function.

3. The user device of claim 1, wherein:
   the virtual object is associated with the at least one additional user device; and
   the at least one audio signal is a transmitted audio signal from the at least one additional user device.

4. The user device of claim 1, wherein the virtual object is further associated with an image or additional video, and the user device further comprises an object renderer configured to display the image or additional video at the relative object position and orientation.

5. The user device of claim 1, wherein:
   the relative position/orientation determiner is configured to determine smoothed transition values based on the relative object position and orientation and a default relative object position and orientation; and
   the audio position processor is configured to spatially audio signal process the at least one audio signal to generate at least a two channel audio signal based on the smoothed transition values.

6. The user device of claim 1, wherein the change in the relative object position and orientation is a result of the user device being physically moved to cause the at least one image capturing device to turn away from the virtual object.

7. A method implemented at a user device for generating a scene, the method comprising:
   capturing video of an area within a field of view of a user wearing the user device, the user device being a head-mountable device;
   determining a virtual object for the scene, the virtual object being associated with at least one audio signal, the scene being a shared mixed-reality scene environment representing the captured video of the area within the field of view of the user wearing the user device combined with the virtual object;
   communicating the shared mixed-reality scene environment with a device of at least one additional user over a communications network, the shared mixed-reality scene environment enabling one or more of a functional attribute or a positional attribute of the virtual object to be controlled by the user and the at least one additional user;
   determining a spatial relationship between a user of the user device and the virtual object;
   spatially audio signal processing the at least one audio signal to generate at least a two channel audio signal based on the spatial relationship;

determining over a determined time period a change in the spatial relationship;

determining that the virtual object has moved outside the field of view based on the change in the spatial relationship being greater than a threshold value; and generating one or more smoothed relative values representing a relative position and orientation of the virtual object outside the field of view based on a determination that the virtual object has moved outside the field of view, the relative position and orientation usable for the spatially audio signal processing of the at least one audio signal.

8. The method of claim 7, wherein spatially audio signal processing the at least one audio signal comprises processing the at least one audio signal with a head related transfer function with the spatial relationship as a parameter input for the head related transfer function.

9. The method of claim 7, wherein:
the virtual object is associated with the at least one additional user device; and
the at least one audio signal is a transmitted audio signal from the at least one additional user device.

10. The method of claim 7, wherein the virtual object is further associated with an image or additional video, and the method further comprises displaying the image or additional video at a relative position and orientation of the virtual object within the field of view based on the spatial relationship.

11. The method of claim 7, further comprising:
determining smoothed transition values based on the relative position and orientation of the virtual object and a default relative position and orientation of the virtual object; and
spatially audio signal processing the at least one audio signal to generate at least two channel audio signal based on the smoothed transition values.

12. The user device of claim 7, wherein the spatial relationship is defined by a relative direction from the user device to the virtual object and a distance between the user device and the virtual object.

13. The method of claim 7, wherein the spatial relationship is based on the relative position and orientation of the virtual object relative to a device position and orientation of the user device and a determined position and orientation offset, the determined position and orientation offset representing a difference between the device position and orientation of the user device and a center of hearing location of the user wearing the user device.

14. The method of claim 7, wherein the change in the spatial relationship is caused by physical movement of the user device that turns the user device away from the virtual object.

15. The method of claim 7, wherein the spatially audio signal processing includes applying a head related transfer function to the at least one audio signal to produce a spatial output before the at least two channel audio signal is passed to a sound card for output.

16. A computer-readable hardware device comprising a memory storing instructions that are executable by one or more processors of a user device to cause the one or more processors to perform operations for generating a scene, the operations comprising:

capturing video of an area within a field of view of a user wearing the user device, the user device being a head-mountable device;

determining a virtual object for the scene, the virtual object being associated with at least one audio signal, the scene being a shared mixed-reality scene environment representing the captured video of the area within the field of view of the user wearing the user device combined with the virtual object;

determining a relative object position and orientation of the virtual object relative to a device position and orientation of the user device, the relative object position determined to be located within the field of view of the user;

spatially audio signal processing the at least one audio signal to generate at least a two channel audio signal based on the relative object position and orientation;

determining that the virtual object has moved outside the field of view based on a change in the relative object position and orientation being greater than a determined threshold value over a determined period of time; and generating a smoothed relative object position and orientation outside the field of view as the relative object position and orientation based on a determination that the virtual object has moved outside the field of view, the smoothed relative object position and orientation usable in the spatially audio signal processing of the at least one audio signal.

17. A computer-readable hardware device as recited in claim 16, wherein the user device comprises a wearable device having at least one camera configured to capture the video of the area within the field of view of the user.

18. A computer-readable hardware device as recited in claim 16, wherein:
the shared mixed-reality scene environment is communicated to a device of at least one additional user over a communications network;
the scene is controllable by the user via the user device; and
the shared mixed-reality scene environment enables one or more of a functional attribute or a positional attribute of the virtual object to be controlled by both the user and the additional user.

19. A computer-readable hardware device as recited in claim 16, wherein the change in the relative object position and orientation is caused by the user device being physically moved effective to cause the at least one image capturing device to turn away from the virtual object.

20. A computer-readable hardware device as recited in claim 16, wherein spatially audio signal processing includes applying a head related transfer function to the at least one audio signal to produce a spatial output before the two channel audio signal is passed to a sound card for output.

* * * * *